May 17, 1949.  F. A. BARR  2,470,458
PROTRACTOR
Filed June 7, 1946  2 Sheets-Sheet 1
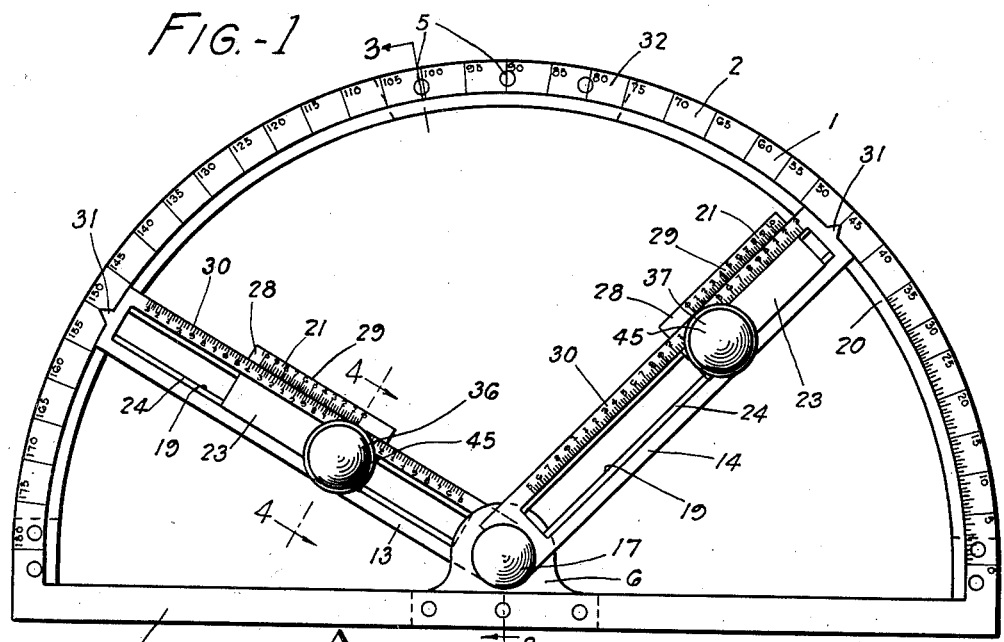
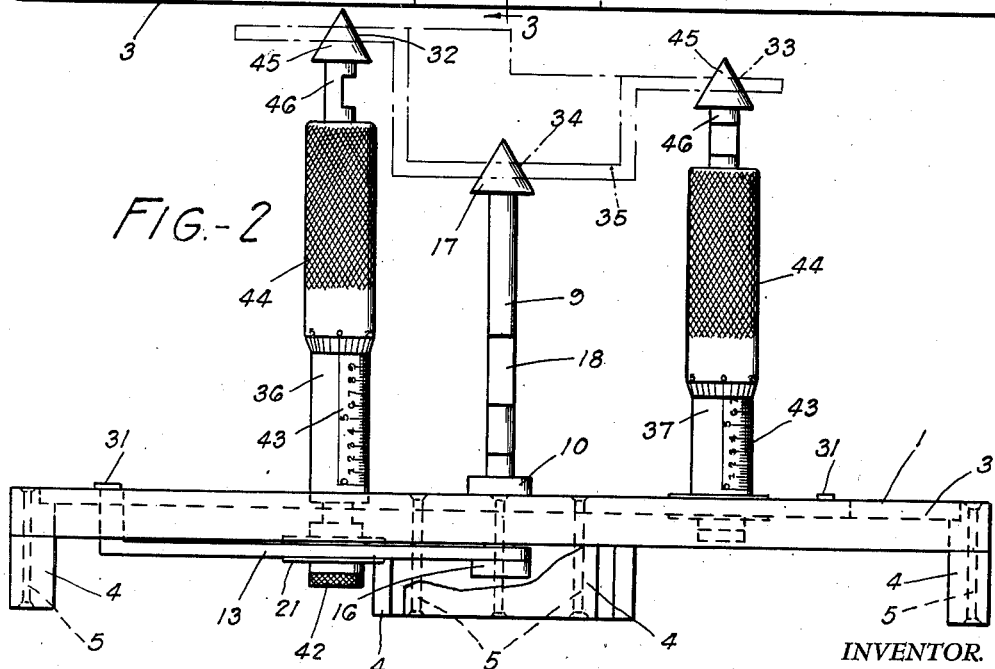
INVENTOR.
FRANCIS A. BARR
BY Victor J. Evans & Co.
ATTORNEYS May 17, 1949.　　　　　F. A. BARR　　　　2,470,458
PROTRACTOR
Filed June 7, 1946　　　　　　　　　　2 Sheets-Sheet 2
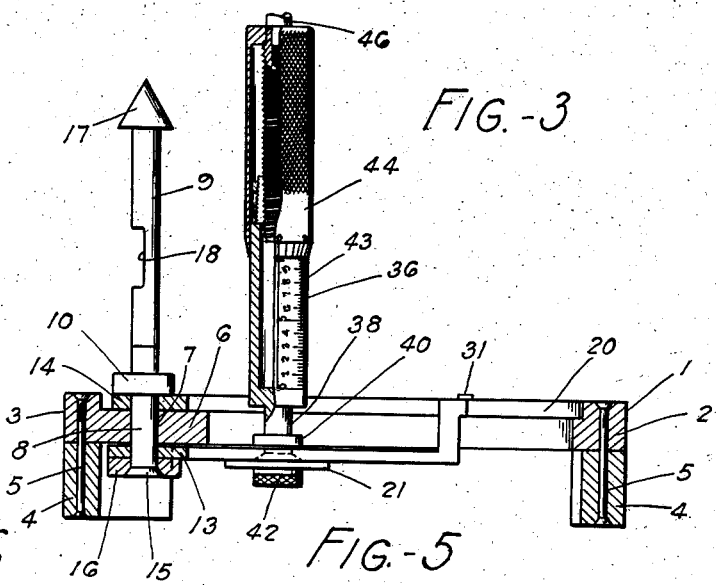
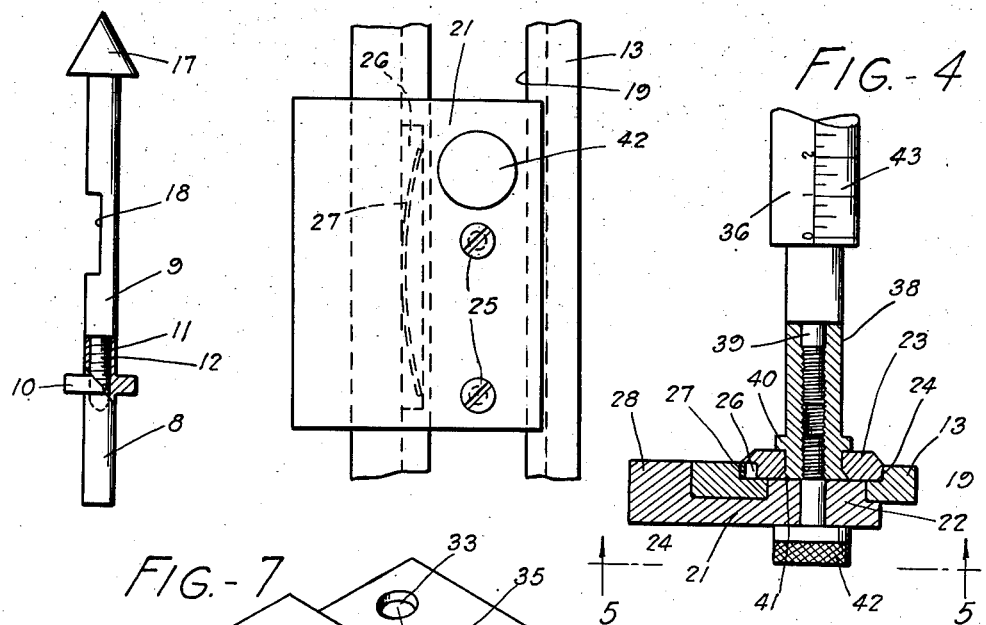
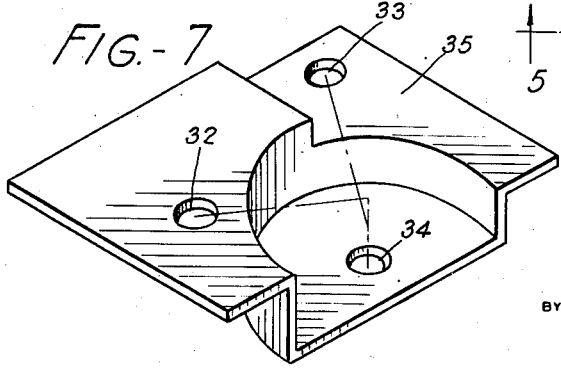
INVENTOR.
FRANCIS A. BARR
BY Victor J. Evans & Co.
ATTORNEYS Patented May 17, 1949

2,470,458

UNITED STATES PATENT OFFICE 2,470,458

PROTRACTOR

Francis A. Barr, Laurelton, Long Island, N. Y.

Application June 7, 1946, Serial No. 675,058

6 Claims. (Cl. 33—75)

This invention relates to a measuring instrument and more particularly to a protractor so formed that it may be used for obtaining measurements customarily requiring the use of a number of instruments, such as a height gage, space blocks, sine bar and angle plate.

One object of the invention is to provide an instrument or tool wherein there is provided a body having the shape of a protractor and arms pivoted at the center of the base bar and having their free ends slidably engaged with the arcuate bar of the protractor, the said arms serving as caliper arms for taking linear measurements and the protractor serving as means for taking angular measurements.

Another object of the invention is to provide arms having their free ends so engaged with the arcuate bar of the protractor that while the arms may be swung to angularly adjusted positions they will be held in engagement with the protractor and pointers at ends of the arms maintained in cooperating relation to scale markings provided upon the arcuate bar of the protractor.

Another object of the invention is to provide arms which are slotted to receive a plate carrying a post marked with a scale and carrying a sleeve which is adjustable vertically for movement into an opening in an object to be measured the plate being provided with a vernier scale which cooperates with the scale on the arm for linear measurements.

Another object of the invention is to provide a measuring instrument which is very accurate and easy to operate.

The invention is illustrated in the accompanying drawings wherein:

Figure 1 is a top plan view of the improved instrument;

Figure 2 is a front elevation thereof;

Figure 3 is a sectional view taken along the line 3—3 of Figure 1, the center post, for clarity, being shown in elevation;

Figure 4 is a fragmentary sectional view taken along line 4—4 of Figure 1;

Figure 5 is a bottom view taken along line 5—5 of Figure 4;

Figure 6 is a view of the center post upon which the arms are pivotally mounted;

Figure 7 is a perspective view of an object to be measured.

This improved measuring instrument includes in its construction a protractor 1 having an arcuate bar 2 of 180° and a base bar 3 extending between ends of the arcuate bar. A suitable number of pads or feet 4 are mounted under the protractor by rivets 5 to support the protractor above a surface upon which the pads rest. An ear 6 extends from the base bar midway the length thereof and is formed with an opening 7 to receive the lower portion 8 of a center post 9 formed with a rigid collar 10. The lower portion or foot 8 of the post 9 has a threaded stem 11 screwed into a socket 12 formed in the post and this foot passes through openings formed through inner ends of arms 13 and 14, mounted above and below the ear 6, and has its lower end upset, as shown at 15 to engage a washer 16 and cause the washer and the collar to frictionally grip the arms and frictionally hold the arms against free swinging movement. Therefore the arms may be swung about the foot to angularly adjusted positions where they will remain until again manually moved. A conical head 17 is provided at the upper end of the post 9 and intermediate its height the post is recessed to form a flat reference face 18. The head 17 may be removably mounted upon the post so that it may be detached and a head of a different size applied if so desired.

The arms 13 and 14 are formed with longitudinally extending slots 19 and their free ends rest in a recess 20 formed along the inner edge of the arcuate bar 2 of the protractor to support free ends of the arms and guide swinging movement of the arms. Under each arm is a plate 21 formed with an upstanding boss 22 which fits snugly in the slot of the arm and over the boss is disposed an auxiliary plate or strip 23 which is seated in recesses 24 bordering the slot 19 of the arm and secured to the boss by screws 25. A recess 26 is formed along a side edge of the strip to receive a spring 27 which bears against the side wall of the recess 24 along one side of the slot 19 and prevents free sliding of the strip 23 and the plate 21 to which it is secured. A side edge portion of each plate is extended upwardly to form a flange 28 having a scale 29 marked upon its upper surface and this scale cooperates with the scale 30 extending along the adjoining side edge portion of the arm to which the plate is slidably connected. The scale 30 is divided into tenths and hundredths of an inch and the scale 29 into thousandths of an inch and by making use of the companion scales very accurate measurements may be made. At its outer end each arm is formed with a pointer 31 which overlaps the arcuate bar 2 of the protractor 1 and when the arms are swung about the post 9 the pointers move relative to the scale 32 marked upon the upper face of bar 2 which is divided to provide 180 degrees of a circle. Therefore the arms may be used for computing angular relation of the openings 32, 33 and 34 in the work 35 to each other and also the distances between the opening 34 and the openings 32 and 33.

Posts 36 and 37 are carried by the strips 23 and each has a lower portion or supporting pedestal 38 which is internally threaded to receive the threaded stem 39 of the post. The pedestal passes through an opening in the strip 23 to which it is applied and is formed with a collar 40 so that when the lower end of the pillar is upset, as shown at 41, the pillar will be firmly held to the strip. A screw 42 is passed upwardly through the plate 21 and into the lower end of the pillar and tightened to firmly clamp the pillar against the boss 22 of the plate. A scale 43 is marked vertically along each post and the flat face of each post carries a sleeve 44 which is threaded to the post so that by turning the sleeve it will be shifted vertically and a head 45 at the upper end of a neck 46 moved into the opening 32 or 33 under which the post is disposed. The pillars of the two posts 36 and 37 are of such height that lower ends of the posts will be in the same plane and when the sleeves of the posts are shifted vertically to dispose their heads in the openings 32 and 33 the difference in the vertical planes of the openings may be ascertained by observing the scales 43 and the relation of lower ends of the sleeves 44 to the scales.

Having thus described the invention what is claimed is:

1. A measuring instrument comprising a protractor having an arcuate bar and a straight cross bar, an ear extending inwardly midway the length of said cross bar, the arcuate bar being formed along its inner edge with a recess, a post mounted vertically through said ear and having a head at its upper end, arms pivotally mounted about said post above and below the ear and extending radially of the protractor and having their outer ends resting in the recess and terminating in pointers overlapping the arcuate bar for cooperation with a scale marked upon the upper face of the arcuate bar, a slot being formed in each arm longitudinally thereof and bordered by recesses along its side edges, there being scale markings along the upper face of each arm along a side edge thereof, plates under the arms having bosses fitting into the slots thereof and provided with upstanding flanges along side edges of the arms, the flanges having their upper faces provided with scale markings companion to the scales of the arms, strips fitting into the recesses of the arms, screws passed through the plates and their bosses and into the strips to secure the strips to the plates, posts over said arms, pillars having their lower ends mounted through the strips, screws passed upwardly through the plates and their bosses and lower ends of the pillars, the posts over the arms having stems at their lower ends screwed into upper ends of the pillars, there being vertical scales marked upon the posts, sleeves screwed upon the posts for vertical adjustment thereon relative to their scales, and necks projecting upwardly from the sleeves and having heads at their upper ends.

2. A measuring instrument comprising a protractor having an arcuate bar and a cross bar, a post mounted vertically midway the length of the cross bar, arms pivotally mounted about said post and extending radially of the protractor and having pointers at their free ends overlapping the arcuate bar for cooperating with degree marks thereon, said arms being formed with longitudinally extending slots bordered by recesses, plates under said arms having bosses fitting into the slots, strips seated in the recesses, screws securing said strips to said plates, posts over said arms having supporting detachable pillars mounted through said strips, securing screws passing upwardly through said plates and into lower ends of the pillars, the plates having upstanding flanges along side edge portions extending along side edges of the arms and provided with scales companion to scales along the adjoining side edges of the arms, the last mentioned posts having flat faces provided with scales, and sleeves threaded about the last mentioned posts provided at their upper ends with heads and having their lower ends extending across the scales of the posts.

3. A measuring instrument comprising a protractor having an arcuate bar and a cross bar, a post mounted vertically midway the length of the cross bar, arms pivotally mounted about said post and extending radially of the protractor and having pointers at their free ends overlapping the arcuate bar for cooperating with degree marks thereon, said arms being formed with longitudinally extending slots, plates slidable along said arms and having portions engaged in the slots, flanges along sides of said plates provided with scales companion to scales upon adjoining side edge portions of the arms, posts extending upwardly from the plates and provided with vertically extending scales, and sleeves threaded upon the last mentioned posts for vertical adjustment and having heads at their upper ends and having their lower ends extending across the scales of the posts.

4. A measuring instrument comprising a protractor having an arcuate bar provided with a scale and a cross bar between ends of its arcuate bar, a post extending upwardly from the cross bar midway the length thereof, arms pivoted to the post above and below the cross bar and having their free ends resting in a recess formed along the inner side edge of the arcuate bar and provided with pointers cooperating with the scale, plates carried by said arms and slidable along the same, the plates having flanges along side edges provided with scales companion to scales provided along adjoining side edges of the arms, posts rising from said plates and provided with vertically extending scales, and sleeves threaded upon the last mentioned posts from upper ends thereof and having their lower ends extending across the scales of the posts.

5. A measuring instrument comprising a protractor having an arcuate bar provided with a scale and a cross bar between ends of its arcuate bar, a post extending upwardly from the cross bar midway the length thereof, arms pivoted to the post and having their free ends provided with pointers cooperating with said scale provided along the arcuate bar, said arms being formed with longitudinally extending slots and with recesses bordering side edges of the slots, plates under the arms having bosses fitting within the slots and upstanding flanges along their side edges provided with scales companion to scales provided along adjoining side edge portions of the arms, strips secured upon upper faces of the bosses and having their side edge portions fitting into the recesses, a side edge of each strip being formed with a recess, springs in the recesses of the strips engaging walls of the confronting recesses of the arms and frictionally holding the plates in adjusted positions, posts arising from the plates and their strips and provided with vertical scales, and sleeves threaded upon the last mentioned posts with their lower ends extending across the scales thereon.

6. A measuring instrument comprising a protractor having an arcuate bar provided with a scale and a cross bar between ends of its arcuate bar, a post extending upwardly from the cross bar midway the length thereof, arms pivoted to the post and having their free ends provided with pointers cooperating with a scale provided along the arcuate bar, mounting members slidable along said arms and provided with scales companion to scales provided upon the arms, posts rising from the mounting members and provided with vertical scales, and sleeves threaded upon the last mentioned posts with their lower ends extending across the scales thereon.

FRANCIS A. BARR.

REFERENCES CITED

The following references are of record in the file of this patent:

UNITED STATES PATENTS

| Number | Name | Date |
|---|---|---|
| 397,286 | Hansel | Feb. 5, 1889 |
| 685,288 | Miller | Oct. 29, 1901 |
| 1,314,184 | Clark | Aug. 26, 1919 |
| 1,671,341 | Brown | May 29, 1928 |

FOREIGN PATENTS

| Number | Country | Date |
|---|---|---|
| 1,564 | Great Britain | 1910 |
| 15,281 | Great Britain | 1892 |